(12) United States Patent
Shigeno et al.

(10) Patent No.: US 7,580,125 B2
(45) Date of Patent: Aug. 25, 2009

(54) LIQUID CELL

(75) Inventors: Masatsugu Shigeno, Chiba (JP); Akira Inoue, Chiba (JP)

(73) Assignee: Seiko Instruments Inc. (JP)

( * ) Notice: Subject to any disclaimer, the term of this patent is extended or adjusted under 35 U.S.C. 154(b) by 474 days.

(21) Appl. No.: 11/586,401

(22) Filed: Oct. 25, 2006

(65) Prior Publication Data
US 2007/0145290 A1    Jun. 28, 2007

(30) Foreign Application Priority Data
Oct. 31, 2005    (JP)    ............................. 2005-316287

(51) Int. Cl.
*G01N 1/10*    (2006.01)
(52) U.S. Cl. ...................................... 356/246; 356/440
(58) Field of Classification Search ................. 356/244, 356/246, 432–440
See application file for complete search history.

(56) References Cited

U.S. PATENT DOCUMENTS

| 3,998,592 | A | * | 12/1976 | Pyle | ............................. | 422/52 |
| 4,566,791 | A | * | 1/1986 | Goldsmith | .................. | 356/246 |
| 4,756,883 | A | * | 7/1988 | Romanauskas | ............... | 422/72 |
| 5,140,169 | A | * | 8/1992 | Evens et al. | .................. | 250/576 |
| 5,170,286 | A | * | 12/1992 | Zimmerberg et al. | ....... | 359/398 |
| 6,657,718 | B1 | * | 12/2003 | Petersen et al. | ............. | 356/246 |
| 2008/0061232 | A1 | * | 3/2008 | Iyoki et al. | .................. | 250/306 |

* cited by examiner

*Primary Examiner*—Hoa Q Pham
(74) *Attorney, Agent, or Firm*—Adams & Wilks

(57) ABSTRACT

A liquid cell 1 for fixing a sample S in a condition in which the sample S is dipped in a solution W, including a lower mount 2 including a bottom plate 10 having a mounting surface 10a on which the sample is mounted, and a wall section 11 disposed on the bottom plate so as to surround the periphery of the mounted sample and capable of trapping the solution inside the surrounded area, an upper mount 3 including an upper plate 20 abutting on an upper surface of the wall section, and a flange section 21 formed so as to be bent from an outer edge of the upper plate at an angle of substantially 90 degrees, and abutting on an outer peripheral surface of the wall section, the upper mount being capable of fitting to the lower mount from above, and a holding member 4 that abuts on an outer edge of the sample to press the sample against the mounting surface from above when the upper mount fits, wherein, an outer peripheral surface of the wall section and an inner circumferential surface of the flange section are provided with fitting means 5 that fits the upper mount to the lower mount while screwing the upper mount, is provided.

17 Claims, 5 Drawing Sheets

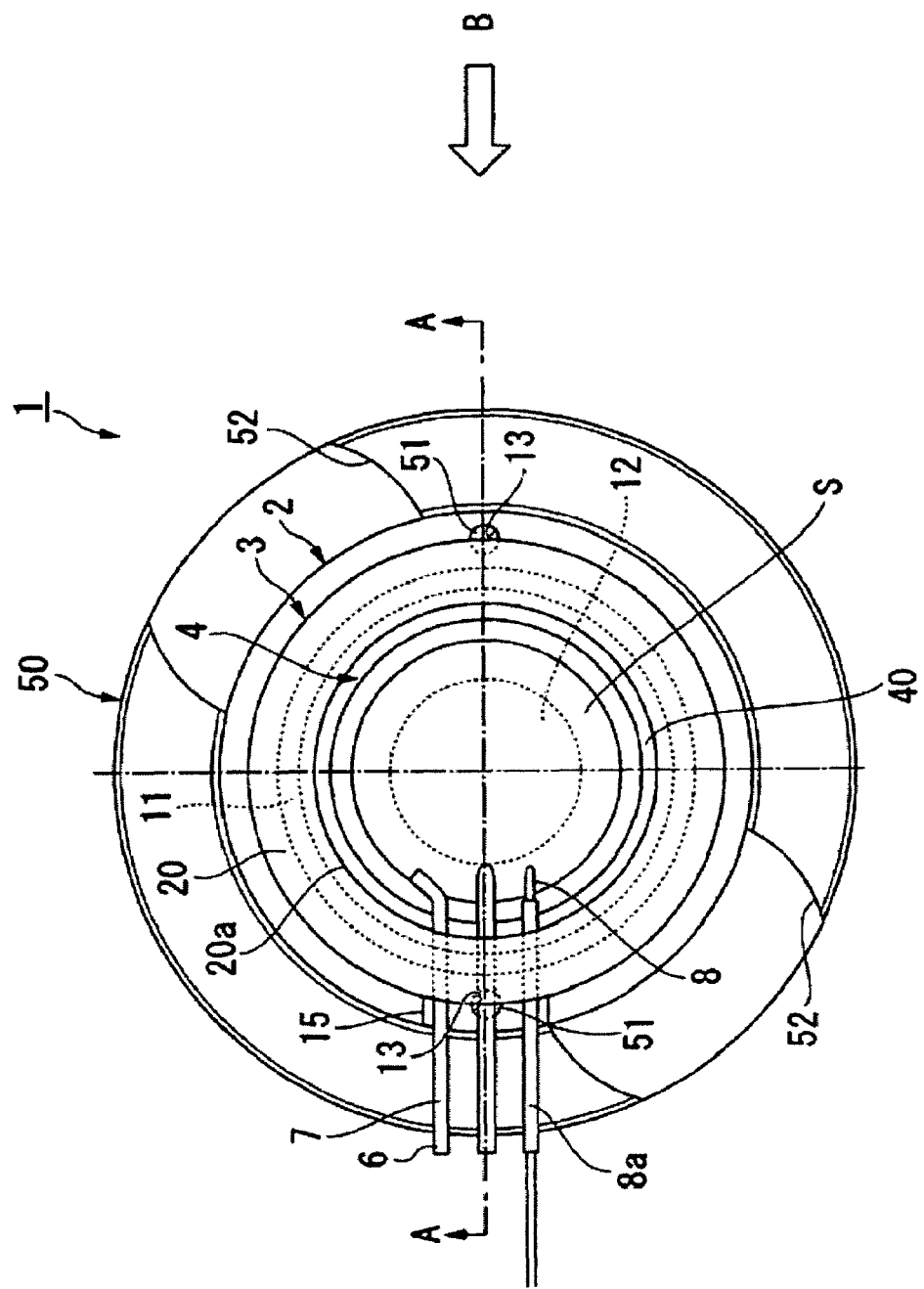

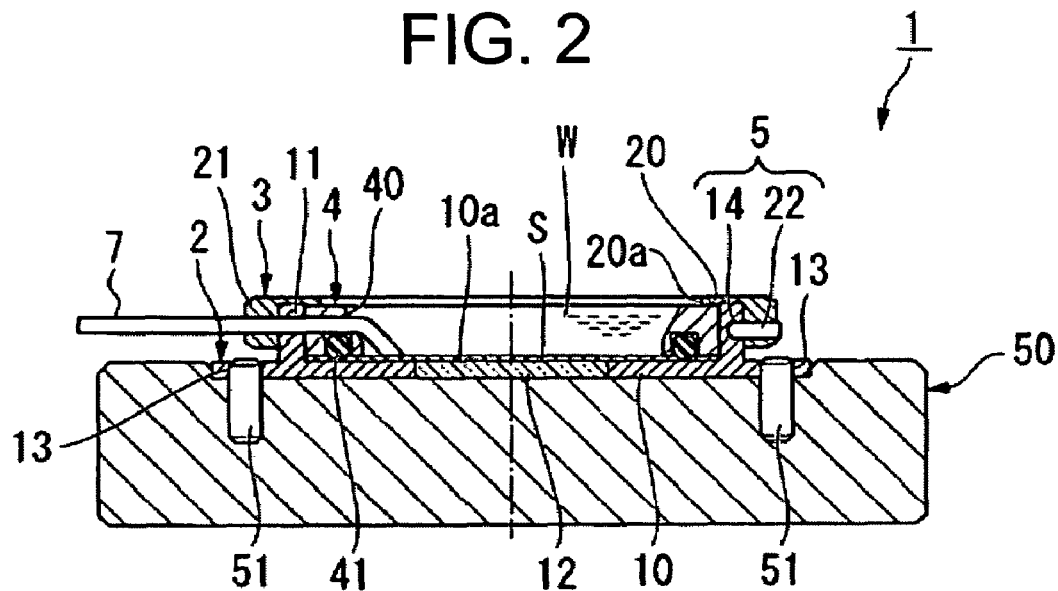
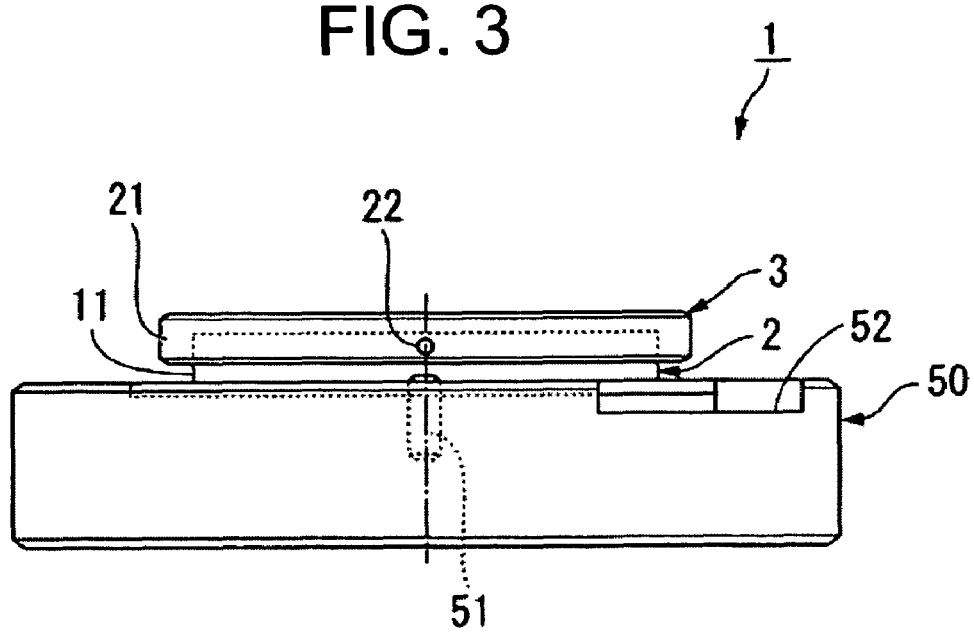

LIQUID CELL

BACKGROUND OF THE INVENTION

1. Field of the Invention

The invention relates to a liquid cell for fixing a sample when the sample is observed in a liquid solution by a scanning probe microscope.

2. Description of the Related Art

As widely known to the public, as a device for measuring a sample such as a metal, a semiconductor, a ceramic, resin, a polymer, a biomaterial, or an insulator in a microscopic region to perform measurement, observation, and so on of physicality information of the sample such as viscoelasticity thereof or the surface profile of the sample, a scanning probe microscope (SPM) is known. The scanning probe microscope offers various modes of measurement methods selectable in accordance the sample as the target of the measurement or the observation. An in-liquid measurement mode for observing the sample in a solution such as a culture solution is one of such measurement modes.

In the in-liquid measurement mode, the measurement is usually performed in the condition in which the cantilever and the sample are both completely dipped in the solution. In this case, there are various methods of fixing the sample. In a typical scanning probe microscope, there is adopted a method of fixing the sample to a dedicated stage so as to hold the sample down on the stage using a plurality of screws (see, for example, Patent Document 1). According to this method, since the sample can securely be fixed at a predetermined position, the in-liquid measurement can surely be performed.

Meanwhile, there are also provided various kinds of liquid cells used by only sinking the sample in the solution (see, for example, Patent Documents 2, 3).

[Patent Document 1] JP-A-9-89909

[Patent Document 2] JP-A-2003-121335

[Patent Document 3] JP-A-9-54098

Meanwhile, in the conventional method described above, the following problems were left unsolved.

Namely, in the sample fixing method utilizing a plurality of screws described in the Patent Document 1 and so on, it was necessary to adjust the tightening torque to be equal in each of the screws for fixing the sample on the level. However, the adjustment was difficult and required experience, and also required operation time even for a skilled operator. Further, since the sample is exposed to the atmosphere during the adjustment is performed, long operation time raises the probability of occurrence of the deterioration such as drying or oxidization. There were some cases in which a harmful influence was exerted to the measurement.

Further, it is necessary to perform the operation of attaching and detaching the plurality of screws every time the sample is fixed. There is a probability of contamination caused by the screw dropping off and touching the surface of the sample. There were some cases in which the measurement became difficult.

On the other hand, in the liquid cell used for only sinking the sample in the solution, the sample might float depending on the specific gravity. Therefore, there was a limitation that the sample with sufficiently greater specific gravity than the solution can only be used. It was not a method applicable to all of the samples.

SUMMARY OF THE INVENTION

The invention was made considering such circumstances, and has an object of providing a liquid cell with which anyone can easily and surely fix a sample in a short period of time.

In order for achieving the object described above, the invention provides the following means.

A liquid cell according to the invention is a liquid cell that fixes a sample in a condition in which the sample is dipped in a solution, including a lower mount including a bottom plate formed like a flat plate and having a mounting surface on which the sample is mounted, and a wall section having a circular shape disposed on the bottom plate so as to surround the periphery of the mounted sample and capable of trapping the solution inside the surrounded area, an upper mount including an upper plate formed like a flat plate in a condition in which an opening is formed in a center of the upper plate and abutting on an upper surface of the wall section, and a flange section formed so as to be bent from an outer edge of the upper plate at an angle of substantially 90 degrees, and abutting on an outer peripheral surface of the wall section, the upper mount being capable of fitting to the lower mount from above, and a holding member that abuts on an outer edge of the sample to press the sample against the mounting surface from above when the upper mount fits, wherein, an outer peripheral surface of the wall section and an inner circumferential surface of the flange section are provided with fitting means that fits the upper mount to the lower mount while screwing the upper mount.

In the liquid cell according to the invention, firstly, the sample is mounted on the mounting surface of the bottom plate of the lower mount. In this case, the mounted sample is surrounded, in the outer periphery thereof, by the wall section formed annularly. Then, the both mounts are integrally combined by fitting and fixing the upper mount to the lower mount having the sample mounted thereon. Namely, in the condition in which the flange section is set towards the lower mount, the upper mount is screwed therein while the inner circumferential surface of the flange and the outer peripheral surface of the wall section slide on each other. By this screwing operation, the fitting means fits the upper mount to the lower mount, and fixes them to each other. In this case, the upper plate of the upper mount and the upper surface of the wall section of the lower mount are in an abutting condition. Thus, it is arranged that the upper mount is prevented from being further screwed than necessary.

Further, this fitting causes the holding member to press the outer edge of the sample against the mounting surface with predetermined force, thereby pressing the sample against the lower mount. Thus, the sample can be securely fixed in a condition in which the sample is pinched between the lower mount and the upper mount.

And, after fixing the sample, the inner area surrounded by the wall section of the lower mount is filled with the solution via the opening of the upper plate. Thus, the sample can be dipped in the solution. Further, when performing the in-liquid measurement, the in-liquid cantilever of the scanning probe microscope is inserted through the opening of the upper plate, thus the sample dipped in the solution can be observed in the solution. In this case, since the holding member holds the outer edge of the sample, it does not affect the measurement by the in-liquid cantilever.

In particular, since the both mounts can be fixed to each other with the fixing means only by screwing (quick method) the upper mount to the lower mount, anyone can easily fix the sample in a short period of time. Further, since the sample can be fixed in a short period of time, the time period in which the sample is exposed to the atmosphere can be shortened as much as possible, thus the probability of occurrence of deterioration such as drying or oxidization can be reduced. As a result, the accuracy of measurement can be improved.

Further, since a screw is not used unlike with conventional ones, there is no possibility that a screw dropped by accident touches the surface of the sample. Therefore, there is no chance to contaminate the sample. This also improves the accuracy of measurement. Further, since the operator can get off paying unnecessary attention (attention to a screw not to drop therefrom, and soon) every time the operator fixes the sample, the handling becomes easy.

Further, since the holding member securely presses the sample against the mounting surface to fix it thereto, unlike with the conventional ones for simply sinking the sample in the solution, there is no chance for the sample to float. Therefore, the limitation for the sample, namely that the sample with a large specific gravity can only be used, for example, can be eliminated, and accordingly, the usability can be enhanced.

As described above, according to the liquid cell of the invention, since anyone can easily and surely fix the sample in a short period of time, the accuracy of measurement in the solution is improved, and the handling thereof becomes easy.

Further, in the liquid cell according to the invention described above, the fitting means includes a plurality of lugs provided to either one of the outer peripheral surface of the wall section and the inner circumferential surface of the flange section, and guide grooves that are provided to the other of the outer peripheral surface of the wall section and the inner circumferential surface of the flange section, and guides the plurality of lugs in a circumferential direction, the lower mount and the upper mount are fitted and fixed to each other in the case in which the lugs are guided to end points of the guide grooves.

In the liquid cell according to the invention, after mounting the sample on the lower mount, in the condition in which a plurality of lugs are inserted in the guide grooves, the screwing of the upper mount is performed. Thus, the plurality of lugs moves towards the end points while being guided by the guide grooves. Further, in conjunction therewith, the lower mount and the upper mount are combined gradually. And, when each of the plurality of lugs has reached the end point of the guide groove, the upper plate of the upper mount and the upper surface of the wall section of the lower mount abut on each other, thus the lower mount and the upper mount are in the condition in which the lower mount and the upper mount are completely fitted to be fixed.

As described above, since the both mounts are fixed to each other with a bayonet coupling in which a plurality of lugs are guided by the guide grooves, they can easily be fixed without any jerky movements, and the tightening torque between the both mounts can always be constant.

Further, in the liquid cell according to the invention described above, the lower mount and the upper mount are each provided with a marking that allows to position the plurality of lugs to start points of the guide grooves.

In the liquid cell according to the invention, by aligning the markings respectively provided to the both mounts, the plurality of lugs can easily and surely be positioned to the start points of the guide grooves. Thus, the positioning of the both mounts becomes simpler, and it does not take a lot of troubles. Therefore, fixing of the sample can be carried out in a shorter period of time.

Further, in any one of the liquid cells according to the invention described above, the holding member is integrally molded with the upper mount.

In the liquid cell according to the invention, since the holding member is integrally molded with the upper mount, the number of components can be reduced, and the combination of the lower mount and the upper mount becomes easier. Therefore, fixing of the sample can be carried out in a shorter period of time.

Further, in any one of the liquid cells according to the invention described above, the holding member is an annular member that abuts on the inner circumferential surface of the wall section and is formed to have substantially the same height as the wall section, the upper mount presses the holding member towards the lower mount via the upper plate.

In the liquid cell according to the invention, after the sample is mounted on the lower mount, and before the upper mount is fitted thereto, the holding member is attached in a condition in which the holding member abuts on the inner circumferential surface of the wall section. It should be noted that, in this condition, the holding member is in a condition in which the holding member is only put on the outer edge of the sample. And, after attaching the holding member, the upper mount is screwed and fitted and then fixed to the lower mount by the fitting means. Further, since the holding member is gradually pressed against the upper plate as the upper mount is gradually fixed thereto, the sample is surely fixed by pressed against the mounting surface.

In particular, since the upper mount and the holding member are separately configured, it is hard to move (slide) the holding member in the peripheral direction in accordance with the upper mount even if the upper mount is operated to be screwed therein. Therefore, the holding member moves so as to simply press the sample from above without affected by the screwing operation of the upper mount. Therefore, the sample can be prevented from being get scratched on the surface.

Further, in any one of the liquid cells according to the invention described above, an outer peripheral surface of the flange section is formed as an uneven shape.

In the liquid cell according to the invention, since the outer peripheral surface of the flange section is provided with knurling, for example, to be an uneven shape, it becomes easy to be grasped and hard to cause a slip of hand in screwing the upper mount. Therefore, the upper mount becomes easier to be screwed in, thus enhancing the workability.

Further, in any one of the liquid cells according to the invention described above, a transparent plate that is optically transparent and allows the sample to be visible from below is provided in a center of the bottom plate.

In the liquid cell according to the invention, since the sample is visible through the transparent plate, the sample dipped in a liquid can be observed with the microscope. Therefore, the sample can be observed from further various directions.

Further, in any one of the liquid cells according to the invention described above, the bottom plate is provided with at least two through holes formed in an area located outside the wall section.

In the liquid cell according to the invention, since the at least two through holes are provided to the bottom plate of the lower mount, these holes can be fitted to, for example, the projections formed on the jig for fixing the lower mount. Thus, the lower mount can securely be fixed so that the lower mount does not moved in accordance with the external force.

Accordingly, it becomes easier to screw the upper mount to the lower mount, thus the both mounts can more easily be fixed to each other.

Further, in any one of the liquid cells according to the invention described above, a duct line that is provided in a condition in which the duct line is pinched between the lower mount and the upper mount and allows the solution to flow through the duct line.

In the liquid cell according to the invention, since the duct line for allowing the solution to flow is provided, the solution can quickly be supplied to dip the sample in the solution after the lower mount and the upper mount are fixed to each other. Therefore, the time period in which the sample is exposed to the atmosphere can further be shortened, thus the deterioration of the sample such as drying can more surely be prevented. Further, since the circulation of the solution is possible by using the duct line, a long-term observation of the sample can be conducted, thus the observation from many directions becomes possible.

Further, in any one of the liquid cells according to the invention described above, a temperature sensor that is provided in a condition in which the temperature sensor is pinched between the lower mount and the upper mount and detects the temperature of the solution.

In the liquid cell according to the invention, since the temperature of the solution can always be obtained with accuracy by the temperature sensor, the in-liquid observation can be performed in the solution of the optimum temperature. Accordingly, the reliability of the measurement result can further be enhanced.

According to the liquid cell of the invention, since anyone can easily and surely fix the sample in a short period of time, the accuracy of measurement in the solution is improved, and the handling thereof becomes easy.

BRIEF DESCRIPTION OF THE DRAWINGS

In the accompanying drawings:

FIG. 1 is a configuration diagram showing an embodiment of a liquid cell according to the invention;

FIG. 2 is a cross-sectional view along the A-A line shown in FIG. 1;

FIG. 3 is a side view of the liquid cell viewed from the arrow B shown in FIG. 1;

DETAILED DESCRIPTION OF THE PREFERRED EMBODIMENT

Figure 4:
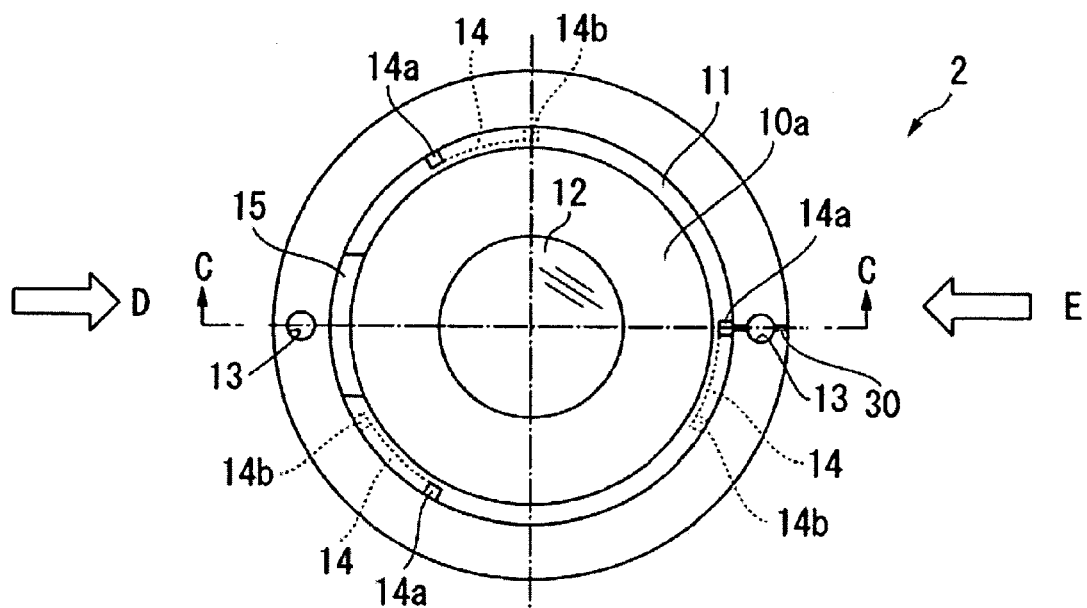
FIG. 4 is a top view of the lower mount configuring the liquid cell shown in FIG. 1.
Figure 5:
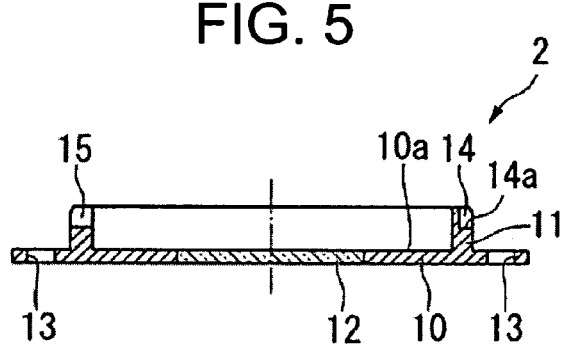
FIG. 5 is a cross-sectional view along the C-C line shown in FIG. 4.
Figure 6:
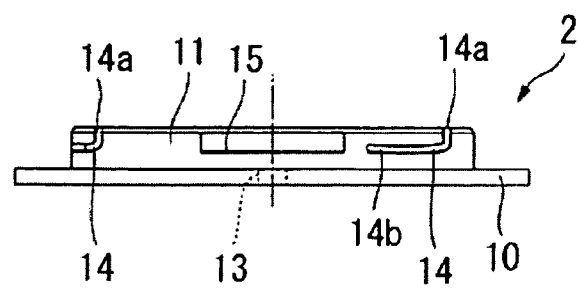
FIG. 6 is a side view of the lower mount viewed from the arrow B shown in FIG. 4.
Figure 7:
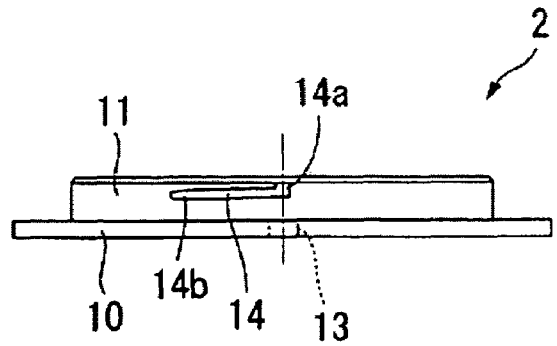
FIG. 7 is a side view of the lower mount viewed from the arrow E shown in FIG. 4.

An embodiment of a liquid cell according to the invention will now be explained with reference to FIGS. 1 through 12.

The liquid cell 1 according to the embodiment, as shown in FIGS. 1 through 3, is for fixing a sample S in the condition in which the sample S is dipped in a solution W, and is provided with a lower mount 2 for mounting the sample S, a upper mount 3 capable of being fit to the lower mount 2 from above, a holding member 4 for holding the sample S down on a mounting surface 10a from above by contacting the sample S on the outer edge thereof when the upper mount 3 is fitted thereto, fitting means 5 disposed on the outer peripheral surface of a wall section 11 of the lower mount 2 and the inner circumferential surface of a flange section 21 of the upper mount 3 and for fitting the upper mount 3 to the lower mount 2 while screwing the upper mount 3, two pipes (duct line) 6, 7 provided in the condition of being pinched between the both mounts 2, 3 and for allowing the solution W to flow through the pipes, and a temperature sensor (temperature detecting section) 8 provided in the condition of being pinched between the both mounts 2, 3 and for measuring the temperature of the solution W.

The lower mount 2 is made of a metal material such as aluminum and is formed like a flat plate, and is integrally molded with a bottom plate 10 having the mounting surface 10a for mounting the sample S and a ring-like wall section 11 provided on the bottom plate 10 so as to surrounding the mounted sample S and capable of trapping the solution W inside of the surrounded area as shown in FIGS. 4 through 7.

The bottom plate 10 is formed to have a circular top view, and is provided with an optically transparent cover glass (a transparent plate) 12 fitted to the center of the bottom plate 10. Further, the mounting surface 10a is defined as the top surface thereof surrounded by the wall section 11.

Further, the bottom plate 10 is also provided with two through holes 13, to which fixing pins 51 for fixing a jig 50 described later are fitted, formed in an area locating outside the wall section 11. The two through holes 13 are formed across the cover glass 12 from each other.

The wall section 11 is formed in a direction perpendicular to the mounting surface 10a and so as to surround the sample S and to have a circular top view. Further, on the outer peripheral surface of the wall section 11, there are formed three guide grooves 14 evenly in the peripheral direction (every 120 degree distance) for respectively guiding three parallel pins 22 (a plurality of lugs) described later in the peripheral direction. Further, in a part of the wall 11, there is formed a notch section 15 for allowing the two pipes 6, 7, and a protective tube 8a for protecting wiring 8b for the temperature sensor 8 to pass.

Figure 8:
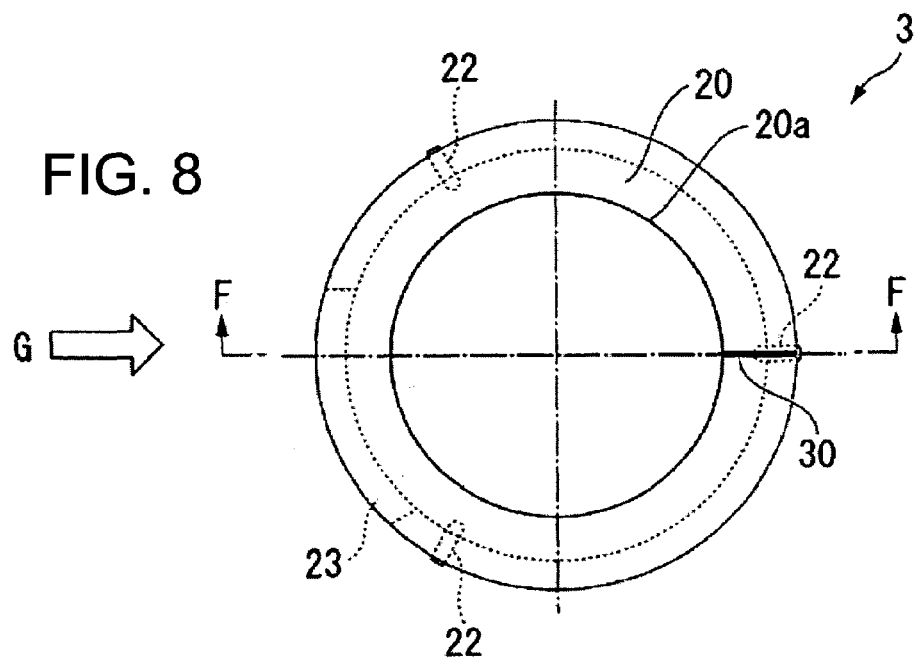
FIG. 8 is a top view of the upper mount configuring the liquid cell shown in FIG. 1.
Figure 9:
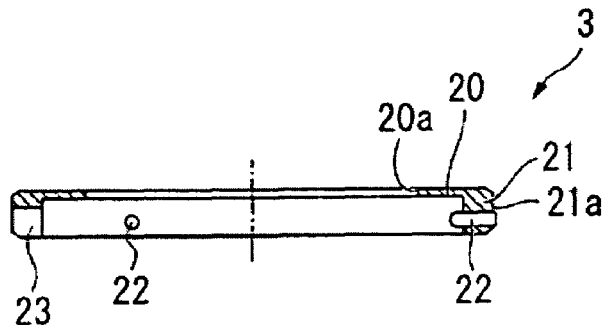
FIG. 9 is a cross-sectional view along the F-F line shown in FIG. 8.
Figure 10:
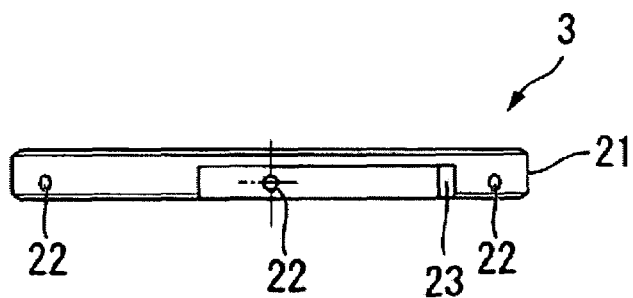
FIG. 10 is a side view of the upper mount viewed from the arrow G shown in FIG. 8.

The upper mount 3 is made of a metal material such as aluminum, and formed like a flat plate with an opening 20a at the center thereof, and is integrally molded with a upper plate 20 abutting on the upper face of the wall section 11, and a flange section 21 formed so as to be bent from the outer edge of the upper plate 20 at an angle of substantially 90 degrees to abut on the outer peripheral surface of the wall section 11 as shown in FIGS. 8 through 10.

On the inner circumferential surface of the flange section 21, three parallel pins 22 disposed evenly in the peripheral direction (every 120 degree distance) are provided so as to project inward. And, in the condition in which the three parallel pins 22 are each positioned to the start point 14a of the guide groove 14 in the lower mount 2, by screwing the upper mount 3 to the lower mount 2, the upper mount 3 and the lower mount 2 are gradually combined with each other while the parallel pins 22 are guided by the guide grooves. And, it is arranged that when the parallel pins 22 are each guided to the end point 14b of the guide groove 14, the lower mount 2 and the upper mount 3 are fitted to be fixed to each other. Namely, the parallel pins 22 and the guide grooves 14 form the fitting means 5.

Further, in the flange section 21, there is formed a notch section 23 for allowing the two pipes 6, 7 and the protective tube 8a to pass, similarly to the wall section 11 of the lower mount 2. It should be noted that the position of the notch section 23 is formed so as to come to the corresponding position to the position of the notch section 15 of the lower mount 2 when the lower mount 2 and the upper mount 3 are fitted to be fixed to each other. Further, the outer peripheral surface of the flange section 21 is provided with knurling to be formed as an uneven shape. Thus, the flange section 21 can be grasped in a non-slippery condition, and becomes easy to be grasped.

Further, as shown in FIGS. 4 through 8, each of the upper mount 3 and the lower mount 2 is provided with a marking 30 imprinted for positioning each of the parallel pins 22 with the start point 14a of the guide groove 14. The markings 30 can be marked by chipping the surfaces of the lower mount 2 and the upper mount 3, or can be marked with printing or stickers. In the present embodiments, an example of marking the markings 30 by chipping the surfaces of the upper mount 3 and the lower mount 2 as lines is illustrated.

Figure 11:
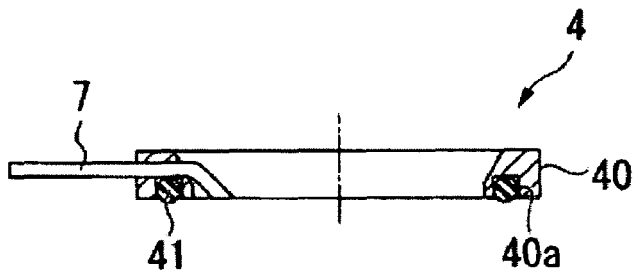
FIG. 11 is a cross-sectional view of the holding member configuring the liquid cell shown in FIG. 1.

The holding member 4 is an annular member disposed between the sample S and the upper mount 3, and formed so as to abut on the inner circumferential surface of the wall section 11 and to have a height substantially the same as the wall section 11 as shown in FIG. 11. Specifically, it is provided with an annular ring section 40 formed so as to have a bracket-like cross-sectional shape with a recess 40a, and an annular O-ring 41 made of fluorocarbon rubber or the like attached inside the recess 40a. And, the holding member 4 is arranged to combined with the lower mount 2 in the condition in which the O-ring 41 is set towards the sample S.

Further, the holding member 4 is arranged to press the sample S against the mounting surface 10a with predetermined force when the upper surface of the ring section 40 is held down by the upper plate 20 of the upper mount 3.

Further, as shown in FIG. 1, the two pipes 6, 7 and the protective tube 8a are fixed to the holding member 4 so as to be arranged adjacent to each other. One pipe 6 out of the two pipes 6, 7 is a supply pipe provided with the solution W from the near anchor side and for supplying inside the wall section 11 with the solution W. Further, the other pipe 7 is a discharge pipe for discharging the solution W trapped inside the wall section 11 to the near anchor side. Further, the tip portions of the two pipes 6, 7 are bent towards the sample S, and is arranged to supply and discharge the solution W at the position near to the sample S.

It should be noted that the near anchor side of each of the both pipes 6, 7 is connected to a solution W supply and discharge section, which is not shown in the drawings, for performing supply and discharge of the solution W.

Further, on the tip portion of the protective tube 8a, there is attached the temperature sensor 8 such as a bimetal, and the wiring 8b electrically connected to a near anchor side of the temperature sensor 8 extends to the near anchor side through the inside of the protective tube 8a. It should be noted that the tip portion of the temperature sensor 8 is similarly bent towards the sample S, and is arranged to detect the temperature of the solution W at a position near to the sample S.

The case in which the sample S is observed in the solution using the liquid cell 1 thus configured will now be explained.

It should be noted that in the present embodiment, the explanations would be made taking the case in which the upper mount 3 is fixed in the condition that the lower mount 2 is fixed to the jig 50 shown in FIGS. 1 through 3, as an example.

The jig 50 is made of a metal material such as aluminum, and is formed to have a circular top view, and capable of mounting the bottom plate 10 of the lower mount 2 on the upper surface thereof. Further, on the upper surface thereof, there are attached the two fixing pins 51 to be respectively inserted in the two through holes 13 provided to the bottom plate 10 of the lower mount 2. Thus, the lower mount 2 is prevented from moving in accordance with an external force when the lower mount 2 is mounted on the upper surface thereof.

Firstly, the lower mount 2 is grasped with fingers, and mounted on the upper surface of the jig 50. In this case, it is mounted so that the fixing pins 51 of the jig 50 is inserted in the through holes 13 of the lower mount 2. Thus, the lower mount 2 is positioned in the horizontal direction, and is set in a condition in which the lower mount 2 is securely held so as not to be moved in accordance with the external force. It should be noted that since step sections 52 are formed on the upper surface of the jig 50 across the lower mount 2 by chipping the surface thereof, the lower mount 2 could be grasped by the fingers until just before the lower mount 2 is mounted thereon.

After the lower mount 2 is fixed, the sample S is mounted on the mounting surface 10a of the bottom plate 10. In this case, the mounted sample S is surrounded by the wall section 11 formed annularly. Further, the sample S is in a condition of being mounted on the cover glass 12 provided to the bottom plate 10.

After the sample S is mounted, the holding member 4 is built onto the lower mount 2 in the condition in which the O-ring 41 is set towards the sample S. Namely, the holding member 4 is built so that the outer peripheral surface of the ring section 40 abuts on the inner circumferential surface of the wall section 11. In this case, it is built onto the lower mount 2 so that the two pipes 6, 7 and the protective tube 8a are located inside the notch 15 of the wall section 11. Thus, the two pipes 6, 7 and the protective tube 8a do not interfere with the lower mount 2.

It should be noted that, since at this moment, the O-ring 41 is in the condition in which the O-ring is simply put on the sample S, it does not press the sample S against the mounting surface 10a. Further, the height of the holding member 4 is arranged to be substantially the same as the height of the wall section 11.

After building the holding member 4, the both mounts 2, 3 are integrally combined with each other by fitting the upper mount 3 to the lower mount 2 to fix them to each other.

Namely, before all, in the condition in which the flange section 21 is set towards the lower mount 2, the both mounts 2, 3 are overlapped so that each of the parallel pins 22 attached to the inner circumferential surface of the flange section 21 is positioned at the start point 14a of the guide groove provided to the outer peripheral surface of the wall section 11. In this case, since the both mounts 2, 3 are respectively provided with the markings 30, the positioning of the parallel pins 22 can easily be performed by only aligning the markings 30 with each other.

It should be noted that since the notch section 23 in the upper mount 3 is formed to come to the position corresponding to the position of the notch section 15 in the lower mount 2 when the aligning described above is performed, there is no chance for the two pipes 6, 7 and the protective tube 8a to interfere with the upper mount 3. Further, as shown in FIG. 8, the notch section 23 of the upper mount 3 is designed to be rather long considering the stroke necessary for the following screwing operation, the upper mount 3 and the two pipes 6, 7 and the protective tube 8a do not interfere with each other even in the screwing operation.

After each of the parallel pins 22 and the start point 14a of the guide groove 14 have been aligned with each other, the outer peripheral surface of the flange section 21 is grasped, and the upper mount 3 is screwed to the lower mount 2. Thus, the inner circumferential surface of the flange section 21 and the outer peripheral surface of the wall section 11 are slid with each other, and the upper mount 3 is gradually screwed therein while the parallel pin 22 are guided by the guide grooves 14. Therefore, the lower mount 2 and the upper mount 3 are gradually combined with each other. And, when each of the parallel pins 22 has reached the end point of the guide groove 14, the upper plate 20 of the upper mount 3 and the upper surface of the wall section 11 of the lower mount 2 abut on each other, thus the both mounts 2, 3 are in the condition in which the both mounts 2, 3 are completely fitted to be fixed.

As described above, since the both mounts 2, 3 are fixed to each other with a bayonet coupling using the parallel pins 22 and the guide grooves 14, they can easily be fixed without any jerky movements. Further, since the upper mount 3 abuts on the wall section 11 when fitting and then fixing to each other, the upper mount 3 can be prevented from being further screwed than necessary, and the tightening torque between the both mounts 2, 3 can be made constant.

On the other hand, since the holding member 4 is pressed in the ring section 40 by the upper plate 20 in accordance with the upper mount 3 is gradually fixed, it can securely pressing the sample S via the O-ring 41 against the mounting surface 10a and fix it thereon. In particular, since the upper mount 3 and the holding member 4 are separately configured, it is hard to move (slide) the holding member 4 in the peripheral direction in accordance with the upper mount 3 even if the upper mount 3 is operated to be screwed therein. Therefore, the holding member moves so as to simply press the sample S from above without affected by the screwing operation of the upper mount 3. Therefore, the sample S can surely be fixed in the condition in which the sample S is pinched between the both mounts 2, 3, while preventing that the surface of the sample S gets scratched.

After fixing the sample S, the solution W is supplied from the solution supply and discharge section via the one pipe 6 to trap the solution W inside the area surrounded by the wall section 11. Thus, the sample S is in a condition in which the sample S is stored in the solution W.

Figure 12:
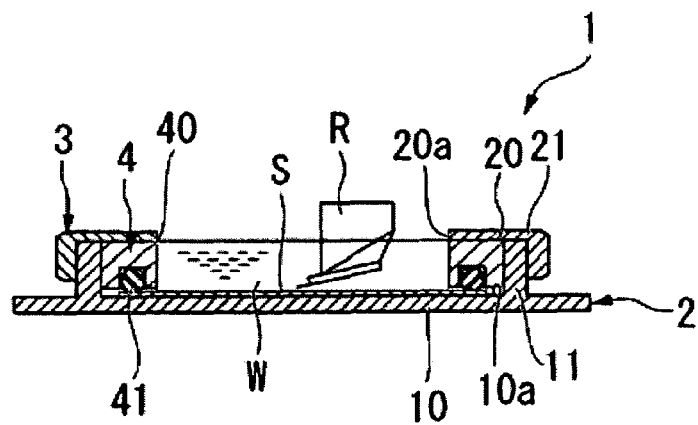
FIG. 12 is a schematic view when the sample is fixed by the liquid cell shown in FIG. 1, and the observation of the sample in the solution is in progress.

And, as shown in FIG. 12, a cantilever R for in-liquid use of the scanning probe microscope is inserted therein via the opening 20a of the upper mount 3 to access the sample S, thus the in-liquid observation of the sample S dipped in the solution W can be executed. In this case, since the holding member 4 holds the outer edge of the sample S, it does not affect the measurement by the in-liquid cantilever R.

As described above, according to the liquid cell 1 of the present embodiment, since the both mounts 2, 3 can be fixed to each other with the fixing means 5 only by screwing (quick method) the upper mount 3 to the lower mount 2, anyone can easily fix the sample S in a short period of time. Further, since the sample S can be fixed in a short period of time, the time period in which the sample is exposed to the atmosphere can be shortened as much as possible, thus the probability of occurrence of deterioration such as drying or oxidization can be reduced. As a result, the accuracy of measurement in the solution can be improved.

Further, since a screw is not used unlike with conventional ones, there is no possibility that a screw dropped by accident touches the surface of the sample. Therefore, there is no chance to contaminate the sample S. This also improves the accuracy of measurement. Further, since the operator can get off paying unnecessary attention (attention to a screw not to drop therefrom, and so on) every time the operator fixes the samples, the handling becomes easy.

Further, since the holding member 4 securely presses the sample S against the mounting surface 10a to fix it thereto, unlike with the conventional ones for simply sinking the sample S in the solution W, there is no chance for the sample S to float. Therefore, the limitation for the sample S, namely that the sample with a large specific gravity can only be used, for example, can be eliminated, and accordingly, the usability can be enhanced.

As described above, since anyone can easily and surely fix the sample S in a short period of time, the accuracy of measurement in the solution is improved, and the handling thereof becomes easy.

Further, since the lower mount 2 is fixed by the jig 50 in the condition in which the movement of the lower mount 2 in the horizontal direction is restricted when the upper mount 3 is screwed thereto, it can easily be held with a hand via the jig 50. Therefore, the screwing operation of the upper mount 3 becomes smoother and easier. Further, since the outer peripheral surface of the flange section 21 of the upper mount 3 is provided with knurling to be formed as an uneven shape, it becomes easy to be grasped and hard to cause a slip. This also makes the upper mount 3 easier to be screwed in, thus enhancing the workability.

Further, since the solution W is quickly supplied using the one pipe 6 after the upper mount 3 is fixed, the time period during which the sample is exposed to the atmosphere can be shortened as much as possible. Further, the circulation of the solution W is also possible using the other pipe 7, a longer-term observation of the sample S becomes possible, thus the observation from more directions becomes possible.

Further, since the temperature of the solution W can always be obtained with accuracy by the temperature sensor 8, the measurement in the solution of optimum temperature can be performed. Accordingly, the reliability of the measurement result can further be enhanced.

Still further, since the cover glass 12 can be disposed on the bottom plate 10 of the lower mount 2, microscopic observation of the sample S can be conducted from below using a microscope device, which is not shown in the drawings. Thus, a plurality of samples S can be observed from more directions by exchanging the cover glasses 12.

Note that the scope of the present invention is not limited to the embodiments described above, but various modifications can be executed thereon within the range of the scope of the invention.

For example, although in the embodiment described above, the fitting means 5 is configured by providing the parallel pins 22 to the inner circumferential surface of the flange 21, and forming the guide grooves 14 on the outer peripheral surface of the wall section 11, this is not the limitation. It is also possible to configuring the fitting means 5 by forming the guide grooves 14 on the inner circumferential surface of the flange 21, and providing the parallel pins 22 to the outer peripheral surface of the wall section 11. Even in this case, the same operational effects can be exerted. Further, although the case with the three parallel pins 22 and the three grooves 14 is exemplified, the number is not limited to three, but a plural number, namely two or more is all right.

Figure 13:
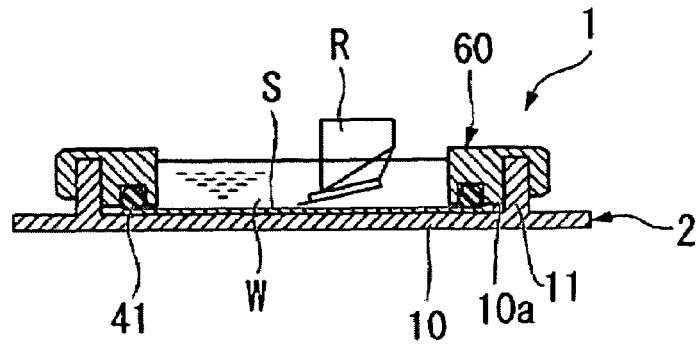
FIG. 13 is a schematic view when the sample is fixed using another upper mount different from the upper mount provided to the liquid cell shown in FIG. 1, and the observation of the sample in the solution is in progress.

Further, although the holding member 4 and the upper mount 3 are separately configured, an upper mount 60 formed by integrally molding the upper mount 3 and the holding member 4 as shown in FIG. 13 is also all right.

In this case, the number of components can be reduced, and there is no need for building the holding member 4 alone into the lower mount 2, thus making the assembly easier. Therefore, the sample S can be fixed in a shorter period of time.

Further, although in the above embodiment, the solution W is supplied using the two pipes 6, 7, the pipes 6, 7 can be eliminated. In this case, it is all right to dip the sample S in the solution W by filling the inner area surrounded by the wall section 11 with the solution W through the opening 20a, after fixing the upper mount 3. It should be noted that it is more preferable to provide the pipes 6, 7 as described above because the solution W can more quickly be supplied.

Further, although the lower mount 2 is previously fixed to the jig 50 when the upper mount 3 is combined with the lower mount 2, the jig 50 is not essential. And, it is all right to fix the both mounts 2, 3 to each other without using the jig 50. It should be noted that use of the jig 50 is preferable because the lower mount 2 can securely be held.

What is claimed is:

1. A liquid cell that fixes a sample in a condition in which the sample is dipped in a solution, comprising:
    a lower mount including a bottom plate formed like a flat plate and having a mounting surface on which the sample is mounted, and a wall section having a circular shape disposed on the bottom plate so as to surround the periphery of the mounted sample and capable of trapping the solution inside the surrounded area;
    an upper mount including an upper plate formed like a flat plate in a condition in which an opening is formed in a center of the upper plate and abutting on an upper surface of the wall section, and a flange section formed so as to be bent from an outer edge of the upper plate at an angle of substantially 90 degrees, and abutting on an outer peripheral surface of the wall section, the upper mount being capable of fitting to the lower mount from above; and
    a holding member that abuts on an outer edge of the sample to press the sample against the mounting surface from above when the upper mount fits,
    wherein, an outer peripheral surface of the wall section and an inner circumferential surface of the flange section are provided with fitting means that fits the upper mount to the lower mount while screwing the upper mount.

2. A liquid cell according to claim 1, wherein the fitting means comprises:
    a plurality of lugs provided to either one of the outer peripheral surface of the wall section and the inner circumferential surface of the flange section; and
    guide grooves that are provided to the other of the outer peripheral surface of the wall section and the inner circumferential surface of the flange section, and guides the plurality of lugs in a circumferential direction,
    the lower mount and the upper mount are fitted and fixed to each other in the case in which the lugs are guided to end points of the guide grooves.

3. A liquid cell according to claim 2, wherein the lower mount and the upper mount are each provided with a marking that allows to position the plurality of lugs to start points of the guide grooves.

4. A liquid cell according to claim 2, wherein the holding member is integrally molded with the upper mount.

5. A liquid cell according to claim 2, wherein
    the holding member is an annular member that abuts on the inner circumferential surface of the wall section and is formed to have substantially the same height as the wall section, and
    the upper mount presses the holding member towards the lower mount via the upper plate.

6. A liquid cell according to claim 2, wherein an outer peripheral surface of the flange section is formed as an uneven shape.

7. A liquid cell according to claim 2, wherein a transparent plate that is optically transparent and allows the sample to be visible from below is provided in a center of the bottom plate.

8. A liquid cell according to claim 2, wherein the bottom plate is provided with at least two through holes formed in an area located outside the wall section.

9. A liquid cell according to claim 2, further comprising a duct line that is provided in a condition in which the duct line is pinched between the lower mount and the upper mount and allows the solution to flow through the duct line.

10. A liquid cell according to claim 2, further comprising a temperature sensor that is provided in a condition in which the temperature sensor is pinched between the lower mount and the upper mount and detects the temperature of the solution.

11. A liquid cell according to claim 1, wherein the holding member is integrally molded with the upper mount.

12. A liquid cell according to claim 1, wherein
    the holding member is an annular member that abuts on the inner circumferential surface of the wall section and is formed to have substantially the same height as the wall section, and
    the upper mount presses the holding member towards the lower mount via the upper plate.

13. A liquid cell according to claim 1, wherein an outer peripheral surface of the flange section is formed as an uneven shape.

14. A liquid cell according to claim 1, wherein a transparent plate that is optically transparent and allows the sample to be visible from below is provided in a center of the bottom plate.

15. A liquid cell according to claim 1, wherein the bottom plate is provided with at least two through holes formed in an area located outside the wall section.

16. A liquid cell according to claim 1, further comprising a duct line that is provided in a condition in which the duct line is pinched between the lower mount and the upper mount and allows the solution to flow through the duct line.

17. A liquid cell according to claim 1, further comprising a temperature sensor that is provided in a condition in which the temperature sensor is pinched between the lower mount and the upper mount and detects the temperature of the solution.

* * * * *